Jan. 26, 1960  J. D. RATJE  2,922,701
FRACTIONAL CRYSTALLIZATION APPARATUS
Filed Sept. 20, 1956  2 Sheets-Sheet 1
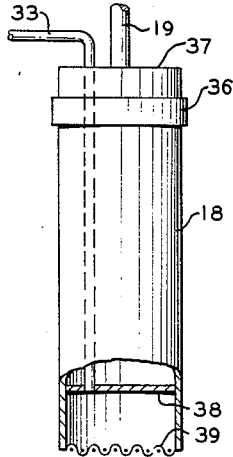
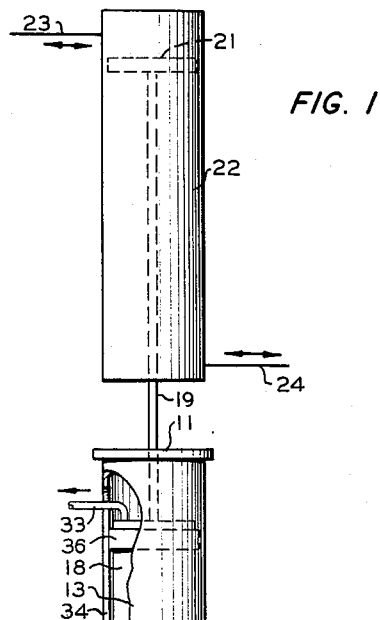
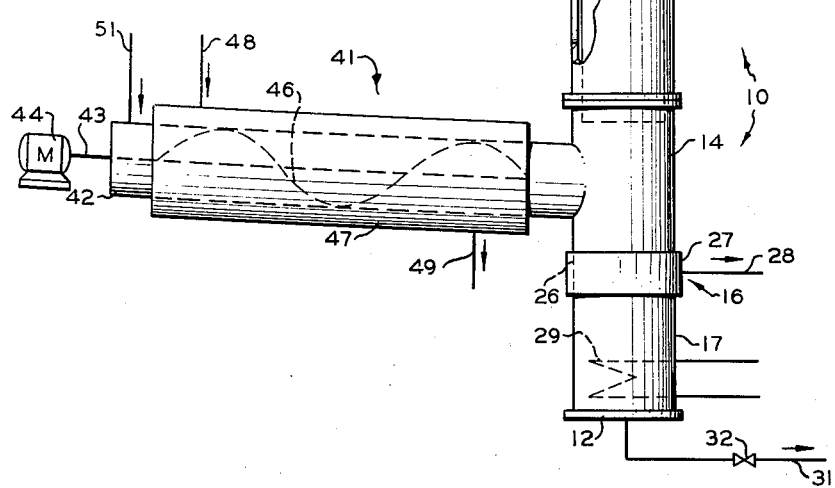
FIG. 1
FIG. 2
INVENTOR.
J.D. RATJE
BY Hudson and Young
ATTORNEYS Jan. 26, 1960
J. D. RATJE
2,922,701
FRACTIONAL CRYSTALLIZATION APPARATUS
Filed Sept. 20, 1956
2 Sheets-Sheet 2
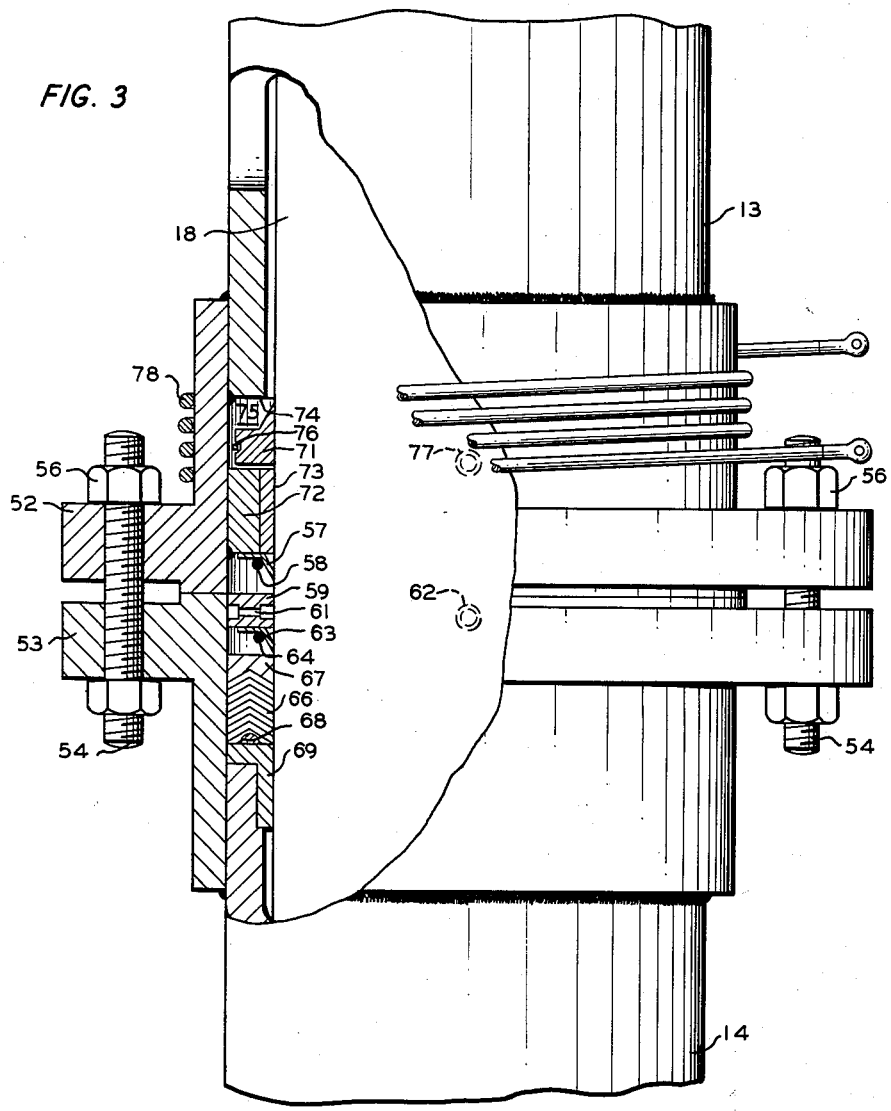
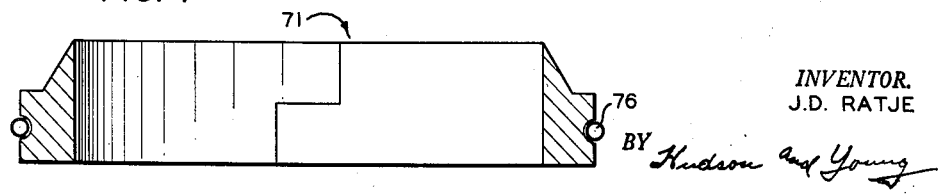
INVENTOR.
J.D. RATJE
BY *Hudson and Young*
ATTORNEYS United States Patent Office 2,922,701
Patented Jan. 26, 1960

2,922,701

FRACTIONAL CRYSTALLIZATION APPARATUS

John D. Ratje, Borger, Tex., assignor to Phillips Petroleum Company, a corporation of Delaware Application September 20, 1956, Serial No. 611,063

7 Claims. (Cl. 23—273)

This invention relates to the separation and purification of components of a liquid multi-component mixture. In one aspect, it relates to the separation and purification of liquid multi-component mixtures by fractional crystallization. In another aspect, it relates to an improved apparatus for use in processes for crystal separation and purification from liquid mixtures.

The separation of chemical compounds by means of crystallization finds many applications in industrial installations. While many separations can be made by distillation or solvent extraction, there are cases where these methods are impracticable or impossible, and the desired separation can be effected more advantageously by means of crystallization. Thus, in the case of chemical isomers having similar boiling points and solubilities, or materials having relatively high boiling ranges, or thermally unstable substances, separation by crystallization may well be the only method which can be advantageously employed.

As well as offering perhaps the only practical method of separation, the crystallization method has the further advantage of being the only separation method which theoretically gives a pure product in a single stage of operation. In actual practice, however, the crystals obtained from a solution of several components will be impure because of the occlusion of mother liquor within the crystal interstices. In conventional fractional crystallization processes, the crystal yield from one-batch crystallization is redissolved in a solvent or remelted and again crystallized to effect further purification. The crystallized product will have less impurities since the concentration of impurities in the new liquor is less than in the previous liquor of crystallization. Such processes require a large amount of equipment and floor space for their operation with resulting high operating expenditures in terms of labor and equipment costs. Furthermore, in these types of processes, the purity of the product is limited by the number of stages through which the process is carried.

Recently, there has been disclosed a continuous method of separating and purifying liquid multi-component mixtures, which overcomes the disadvantages of conventional crystallization processes. In one embodiment, this method involves cooling a liquid multi-component mixture from which the separation is to be made so as to form crystals of at least the higher melting component and thereafter separating mother liquor from the crystals. The crystals are then introduced into a purification column in one portion of which a melting section is maintained. By means of a crystal mover, the crystals are moved as a crystal bed toward a melting section in the purification column wherein the crystals are melted. A portion of the melt is withdrawn as product while the remainder is displaced as a reflux stream countercurrently to the movement of crystals and in intimate contact therewith so as to remove occluded impurities.

When employing a piston as the crystal mover in the above-described process, it is generally necessary to provide sealing means in the purification column in order to prevent leakage of liquid around the piston. Under some conditions, difficulty has been encountered in the operation of the apparatus because of the formation of ice on the column piston. Thus, ice formed on the piston may in some cases destroy the effectiveness of the seal provided between the piston and walls of the column, thereby allowing liquid to escape from the column. The tendency for ice to accumulate on the column piston is particularly pronounced in apparatus in which moisture from the atmosphere can come into contact with the piston. I have now discovered a means and method whereby it is possible to prevent the accumulation of ice on the piston used with fractional crystallization apparatus as described herein.

It is an object of this invention to provide improved fractional crystallization apparatus.

Another object of the invention is to provide an improved method for the separation of components of liquid mixtures.

A further object of the invention is to provide improved crystal purification apparatus which includes means for preventing the accumulation of ice on the piston used to move solids through the apparatus.

Other and further objects and advantages of the invention will become apparent to one skilled in the art upon consideration of the accompanying disclosure.

In accordance with a broad aspect of the present invention, there is provided, in fractional crystallization apparatus comprising a purification column having a reciprocable piston in one end portion thereof, the improvement which comprises means associated with said column for removing ice formed on the piston. In accordance with the more specific aspect of the invention, crystal purification apparatus is provided which comprises an elongated purification column having a heating means disposed in one end portion of the column for melting crystals and a product outlet means connected to this same end of the column. A reciprocable piston is positioned in the opposite end of the column while means are provided for introducing crystals into an intermediate portion of the column. At least one filtering means is located in the column between the heating means and the crystal introduction means. In an enlarged portion of the column upstream with respect to crystal movement from the crystal introduction means, there is positioned a ring member which is in contact with and encompasses the walls of the piston. The end of the ring member which is away from the heating means is in the form of a knife edge adapted to scrape the walls of the piston upon movement thereof toward the filtering means. Sealing means, which is provided between the outer wall of the piston and the inner wall of the column, is located in the column between the ring member and the crystal introduction means.

In accordance with another embodiment of the invention, there is provided in a process which comprises forming a bed of crystals in a purification zone, advancing a piston through said zone so as to move the crystals into a melting zone, melting crystals in the melting zone, displacing at least a portion of the resulting melt into the moving crystal bed, and recovering a product from the melting zone, the improvement which comprises scraping the piston during its advancement through the purification zone so as to remove any ice formed thereon.

The process described herein can be advantageously employed in conjunction with practically any system to which fractional crystallization is applicable in order to increase the efficiency of the separation. Thus, the process and apparatus of this invention are applicable to a vast number of simple binary and complex multi-component systems. The invention is particularly applicable to the separation of hydrocarbons which have practically the same boiling points and are, therefore, difficult to separate by distillation. Where high boiling organic compounds are concerned, separation by distillation is often undesirable because many such compounds are unstable at high temperatures. One particular advantageous application of the process lies in the purification of a component of, for example, 15 to 25 percent purity so as to effect a purity of 98 percent or higher. In order to illustrate some of the systems to which the invention is applicable, the following compounds are grouped with respect to their boiling points:

| Group A | B.P.,°C. | F.P.,°C. |
|---|---|---|
| Benzene | 80 | 5.5 |
| n-Hexane | 69 | −94 |
| n-Heptane | 98.52 | −90.5 |
| Carbon tetrachloride | 77 | −22.8 |
| Acrylonitrile | 79 | −82 |
| Ethyl alcohol | 78.5 | −117.3 |
| 2,2-Dimethylpentane | 79 | −125 |
| 3,3-Dimethylpentane | 86 | |
| Methyl ethyl ketone | 79.6 | −86.4 |
| Methyl propionate | 79.9 | −87.5 |
| Methyl acrylate | 80.5 | |
| 1,3-Cyclohexadiene | 80.5 | −98 |
| 2,4-Dimethylpentane | 80.8 | −123.4 |
| 2,2,3-Trimethylbutane | 80.9 | −25 |
| Cyclohexane | 81.4 | 6.5 |
| Acetonitrile | 82 | −42 |
| Cyclohexene | 83 | −103.7 |
| 2-Methylhexane | 90 | −119 |
| 3-Methylhexane | 89.4 | −119.4 |

| Group B | B.P.,°C. | F.P.,°C. |
|---|---|---|
| Methyl cyclohexane | 100.3 | −126.3 |
| Cyclohexane | 81.4 | 6.5 |
| n-Heptane | 98.52 | −90.5 |
| 2,2,4-Trimethylpentane (isooctane) | 99.3 | −107.4 |
| Nitromethane | 101 | −29 |
| p-Dioxane | 101.5 | 11.7 |
| 2-Pentanone | 101.7 | −77.8 |
| 2-Methyl-2-butanol | 101.8 | −11.9 |
| 2,3-Dimethylpentane | 89.4 | |
| 3-Ethylpentane | 93.3 | −94.5 |

| Group C | B.P.,°C. | F.P.,°C. |
|---|---|---|
| Toluene | 110.8 | −95 |
| Methylcyclohexane | 100.3 | −126.3 |
| 2,2,3,3,-Tetramethyl butane | 106.8 | 104 |
| 2,5-Dimethylhexane | 108.25 | −91 |
| 2,4-Dimethylhexane | 110 | |
| 2,3-Dimethylhexane | 113.9 | |
| 3,4-Dimethylhexane | 116.5 | |
| 3-Ethyl-2-methylpentane | 114 | |
| 3-Ethyl-3-methylpentane | 119 | |

| Group D | B.P.,°C. | F.P.,°C. |
|---|---|---|
| Aniline | 184.4 | −6.2 |
| Toluene | 110.8 | −95 |
| Benzene | 80.0 | 5.5 |

| Group E | B.P.,°C. | F.P.,°C. |
|---|---|---|
| Carbon tetrachloride | 77 | −22.8 |
| Chloroform | 61 | −63.5 |
| $CS_2$ | 46.3 | −108.6 |
| Acetone | 56.5 | −95 |

| Group F | B.P.,°C. | F.P.,°C. |
|---|---|---|
| Ortho-xylene | 144 | −27.1 |
| Meta-xylene | 138.8 | −47.4 |
| Para-xylene | 138.5 | 13.2 |

| Group G | B.P.,°C. | F.P.,°C. |
|---|---|---|
| Ortho-cymene | 175.0 | −73.5 |
| Meta-cymene | 175.7 | <−25 |
| Para-cymene | 176.0 | −73.5 |

| Group H | B.P.,°C. | M.P.,°C. |
|---|---|---|
| Dimethyl phthalate | 282 | 5.5 |
| Dimethyl isophthalate | 124 (12 mm.) | 67 |
| Dimethyl terephthalate | 288 | 140.6 |

| Group I | B.P.,°C. | M.P.,°C. |
|---|---|---|
| Ortho-nitrotoluene | 222.3 | −10.6 / −4.1 |
| Meta-nitrotoluene | 231 | 15.5 |
| Para-nitrotoluene | 238 | 51.3 |

Mixtures consisting of any combination of two or more of the components within any one of the groups can be resolved by the process of the invention, as can mixtures made up of components selected from different groups. For example, benzene can be separated from a benzene-n-hexane or a benzene-n-heptane mixture in which the benzene is present in an amount greater than the eutectic concentration. In the same manner, para-xylene may be readily separated from a mixture of para- and meta-xylenes or from para-, meta-, or ortho-xylenes. Benzene can also be separated from a mixture thereof with toluene and/or aniline. Multi-component mixtures which can be effectively resolved so as to recover one or more of the components in substantially pure form include mixtures of at least two of 2,2-dimethylpentane, 2,4-dimethylpentane, and mixtures of at least two of carbon tetrachloride, chloroform, and acetone. The invention is also applicable to the separation of individual components from a system of cymenes.

This invention can also be utilized to purity naphthalene, hydroquinone (1,4-benzenediol), paracresol, paradichlorobenzene, and such materials as high melting waxes, fatty acids, and high molecular weight normal paraffins. The invention can also be used to resolve a mixture comprising anthracene, phenanthrene, and carbazole. Furthermore, the invention can be used to separate durene (1,2,4,5-tetramethylbenzene) from $C_{10}$ aromatics.

It is not intended, however, to limit the invention to organic mixtures, but rather it is applicable to inorganic mixtures as well, and offers a practical method of separating two inorganic components between which solvates or hydrates are formed. Examples of inorganic systems to which this invention is applicable are those for the recovery of pure salts, such as ammonium nitrate, and of anhydrous salts from their hydrates.

In certain cases, it is also desirable to recover the mother liquor separated from the crystals as a product of the process. This situation arises where it is desired to increase the concentration of a dilute solution. This aspect of the invention is especially applicable to the production of concentrated food products which involves primarily the removal of water from these products. Accordingly, by utilizing the process of this invention, water can be removed from fruit juices such as grape, orange, lemon, pineapple, apple and tomato. It is also possible to concentrate vegetable juices and beverages such as milk, beer, wine, coffee and tea by this method. The desired degree of concentration can be closely controlled by varying the amount of liquid passed as reflux into the moving mass of crystals. This aspect of this invention is in general applicable in those instances where it is desired to increase the concentration of a solution by removing at least a portion of the solvent therefrom.

For a more complete understanding of the invention, reference may be had to the following description and the drawings, in which:

Figure 1 is an elevational view of fractional crystallization apparatus, illustrating diagrammatically one modification of apparatus to which the present invention is applicable;

Figure 2 is an elevational view in section of the piston employed in the apparatus of Figure 1;

Figure 3 is an elevational view, partly in section, showing in detail a portion of the apparatus of Figure 1; and Figure 4 is a sectional view showing the de-icer ring of this invention.

Referring now to Figure 1 of the drawing, the fractional crystallization apparatus as illustrated comprises an elongated crystal purification column 10 closed at its upper and lower ends by closure members 11 and 12, respectively. The crystal purification column is divided into four principle parts, namely, piston guide section 13, crystal feed section 14, filter section 16, and purification section 17. Piston guide section 13 is provided with a piston 18, connected by a connecting rod 19 to hydraulic piston 21 in hydraulic cylinder 22. Lines 23 and 24, which are attached to hydraulic cylinder 22, serve to pass hydraulic fluid alternately into and out of the cylinder so as to drive piston 21 which in turn causes the movement of piston 18. Filter section 16 is a wall-type filter and can be of any suitable structure for effecting the removal of liquid from the column. For example, the filter can comprise a filter screen 26, substantially cylindrical in shape positioned next to the walls of the column. In such a case, the walls of the column next to the filter screen are perforated, the openings in the column being surrounded by a jacket 27 having a liquid outlet line 28 attached thereto. A heat exchange means is provided in the lower end of column 10 in order to maintain a relatively high temperature in the end of purification section 17. As illustrated, the heat exchange means is a coil 29 through which a heat transfer medium is circulated. It is not intended to limit the invention to the specific heat exchange means shown, for other means well known in the art can also be employed. For example, an electrical heater can be positioned next to closure member 12, a coil can be disposed around column 10 at its lower end, or an electrical bayonet-type heater may be provided to extend into the end of the purification column. A liquid outlet line 31 containing a valve 32 is connected to the end of column 10 to provide means for removal of melt from the melting zone maintained in the end of the column by the heat exchange means.

Piston 18, as illustrated, is porous, being pervious to liquid and impervious to crystals. Line 33 is attached to the piston in order to provide means for withdrawing mother liquor, which passes through the piston from the column. During the movement of the piston in the purification column, line 33 rides in longitudinal slot 34 formed in the side of the column. Piston 18 has a ring 36 attached to its upper end to prevent lateral movement of that end of the piston within the column.

For a better understanding of one type of porous piston which may be employed, reference is made to Figure 2 of the drawing. Identical reference numerals have been used in this figure to designate elements described previously with Figure 1. As shown in Figure 2, piston 18 is hollow, being closed at its upper end by closure member 37 to which connecting rod 19 is attached. In the lower portion of the piston, there is disposed a plate 38 attached to the inner walls of the piston. Outlet line 33 passes through closure member 37 and extends through the length of the piston into the space below plate 38. A suitable filter medium, such as screen 39, is attached to the lower end of the piston below plate 38.

Referring again to Figure 1 of the drawing, crystallizing or freezing means 41 comprises a cylindrical inner section 42 containing an axially disposed shaft 43. Shaft 43, which is attached to motor 44, has mounted thereon, a helix or screw 46. A jacket 47 surrounds inner cylinder 42 in spaced relation so as to provide an annular space for heat exchange fluid. Lines 48 and 49 serve to introduce and withdraw heat exchange fluid or refrigerant to and from the crystallizing means. Line 51 connected to the outer end of cylindrical section 42 provides means for introducing feed material into the chiller. Cylindrical section 42 is connected to feed section 14 of column 10 above filter section 16. It is to be understood that it is not intended to limit the invention to any particular crystallizing means, for any suitable means for forming solids by lowering the temperature of a liquid mixture can be employed.

While the crystal purification column has been illustrated and for convenience described as occupying a substantially upright position, it is not intended to so limit the invention. Accordingly, although the vertical position is preferred, it is within the purview of the invention to operate the column in other positions, e.g., in a horizontal position.

The column piston has been described hereinabove as being a porous piston, and the invention is particularly applicable to fractional crystallization apparatus which employs this type of piston. As discussed previously, the present invention is particularly concerned with the problem of ice formation on purification column pistons. The principle cause of such ice formation is that moisture from the atmosphere tends to condense and freeze on the piston. In the case of a porous piston, such as that illustrated in Figure 1, a portion of the piston is continually exposed to the atmosphere so that there is a definite tendency for ice to accumulate on the piston. However, it is not intended to limit the invention to a crystal purification apparatus which employs a porous piston, for it is also applicable to systems using an impervious piston. Thus, in apparatus utilizing an impervious piston, the upper end of the column is sometimes allowed to remain open so that the piston is exposed to the atmosphere, or if the upper end of the column is closed, leakage of air thereinto may still occur. As a result, the problem of ice formation may be present with an impervious piston as well as in a porous piston.

For a clearer understanding of the invention, reference may be had to Figure 3 which shows a cutaway portion of a part of the purification column of Figure 1. Similar reference numerals have been used in Figure 3 to designate elements previously described in conjunction with Figure 1. As illustrated, piston guide section 13 has a flange 52 welded thereto while feed section 14 has a similar flange 53 welded to its upper end. The two flanges are bolted together by means of bolts 54 provided with nuts 56 so as to form a continuous column. It will be noted that the flange members have a larger internal diameter than does the purification column proper, thereby providing a space in which the sealing means and the column piston scraping means are disposed. It is important in the operation of the purification column that effective sealing means be provided between the walls of the column and the column piston. If the sealing means is rendered ineffective in any way, liquid can then escape from the column around the piston.

While any suitable sealing means can be employed to prevent leakage of liquid between the piston and the purification column, one type of seal which has been advantageously used is shown in Figure 3. The sealing means as shown is disposed in the lower portion of the enlarged space formed between flange members 52 and 53 and the column piston and comprises a first seal ring 57 held in position against the piston by means of a resilient member 58, such as a coil spring. Disposed below seal ring 57 is lantern ring 59 provided with a plurality of holes 61 spaced around its periphery. The lantern ring has an I-shaped cross section, and the holes in the ring communicates the surface of the piston with the inner surface of flange member 53. Holes 62, of which two are generally provided, are formed in flange member 53 opposite the grooves in lantern ring 59. A suitable line can be attached to holes 62, thereby providing means whereby any liquid accumulating in the grooves and the openings in the lantern ring can be withdrawn from the column. A second seal ring 63 which is positioned below lantern ring 59, is similar to seal ring 57 and is also provided with a resilient member 64. Any suitable seal ring can be used in both cases, but a type-P seal ring with a Sirvis-Conpor leather packing member as manufactured by the Chicago Rawhide Manufacturing Company of Chicago, Illinois, has been found to provide an effective seal. Positioned below the second seal ring is a chevron-type seal comprising a plurality of leather inverted V-cups 66. The leather cups are held in position against the sides of the piston and the wall of flange member 53 by means of a female adapter 67 and male adapter 68. The male adapter rests upon column piston guide 69 which is a ring member having an inverted L-shaped cross section. Piston guide 69 is attached to the walls of the piston column and together with piston ring member 36, shown in Figure 2, serves to guide the piston in its travel through the purification column.

As previously mentioned, moisture from the atmosphere often tends to condense and freeze on the column piston. It has been found that in some cases the ice so formed destroys the effectiveness of the sealing means and permits liquid to escape from the column around the column piston. In accordance with the instant invention, this problem is eliminated by providing means for scraping the column piston as it moves through the column on its compression stroke. As shown in Figure 3, the scraping means is a ring member 71 positioned in the column in the upper portion of the space formed between flange members 52 and 53 and the walls of the piston. The space in which the de-icer ring is located is further defined by a ring member 72 which is welded to flange member 52. A bearing member 73 is positioned within and attached, as by brazing, to ring member 72 and along with column piston guide 69 and piston ring 36, as shown in Figure 2, provides means whereby the piston is maintained in position in the purification column. Ring member 72 and bearing member 73 also serve as a stop or seat upon which de-icer ring 71 rests. Furthermore, the space formed by ring member 72 and bearing member 73, the sides of flange member 52, end 74 of the purification column and the walls of the piston form a chamber 75 in which ice scraped from the piston during its downward movement can accumulate. The upper end of de-icer ring 71 is in the form of a knife edge so as to facilitate scraping of the ice from the walls of the piston. The de-icer ring is held in place against the piston walls by means of resilient member 76 which rests in a groove in the outer side of the ring. A better understanding of the structure of the de-icer ring can be obtained by referring to Figure 4, in which reference numerals identical to those shown in Figure 3 have been used to designate corresponding elements. As shown in Figure 4, the de-icer ring is formed in segments, preferably in four segments, which interlock to form a continuous ring member. This type of structure is particularly useful in facilitating assembly of the ring on the column piston. As indicated before, a resilient member 76, such as a coil spring, is utilized to hold the de-icer ring in position against the sides of the column piston. At least one hole 77, formed in the side of flange member 52, communicates with chamber 75 in which the de-icer ring is disposed. A suitable outlet line can be attached to hole 77 for removal of any material which may accumulate in chamber 75. It is also within the scope of the invention to provide means whereby any ice accumulating in chamber 75 can be melted. Thus, a heating coil 78 having its end attached to a power source, not shown, encompasses the purification column at a point approximately opposite chamber 75. It is to be understood that other suitable heating means well known in the art can be employed with the purification column to provide means for melting the ice present in chamber 75.

While the above discussion enumerates and describes in detail various elements which make up the crystal purification apparatus, it is to be understood that various variations and modifications of the apparatus can be resorted to which clearly come within the scope of the instant invention. For example, the two flange members 52 and 53 are shown as being welded to the piston guide section and the feed section of the purification column. However, other means can be employed for forming a crystal purification column having enlarged portions therein in which sealing means and the scraping means of this invention can be positioned. For example, the two enlarged portions of the column can be readily formed by appropriate machining of suitable cylindrical members. It is to be understood, therefore, that it is not intended that the invention should be limited to the particular structure shown in the drawing.

In the operation of the apparatus of Figure 1, a liquid feed mixture, which may be a liquid multi-component mixture containing components of different melting points, is introduced through line 51 into chiller 41. A refrigerant is passed into the annular space between cylinder 42 and jacket 47 through line 48 and withdrawn therefrom through line 49 at a rate sufficient to maintain the chiller at a temperature low enough to crystallize one of the components. The crystal slurry formed within chiller 41 is moved by auger 46 through the chiller and into feed section 14 of the purification column. On entering feed section 14, the crystals are forced downwardly through the column by means of piston 18. As a result of the piston contacting the crystal slurry entering the column, mother liquor is caused to flow through the filter screen in the bottom of the piston and thence upwardly through line 33. Mother liquor, separated from the slurry in this manner is withdrawn from the column through line 33 which rides in slot 34 formed in the wall of piston guide section 13. Piston 18 during its compression stroke moves the crystals through feed section 14 of the column and into filter section 16. In filter section 16, additional mother liquor which is separated from the crystals is withdrawn from the filter through line 28. The crystals are thereafter forced by the continued operation of the column piston from the filter section and into purification section 17 where they form a relatively uniform, compact bed or mass of crystals.

Piston 18 is forced downwardly and upwardly by means of hydraulic piston 21 which is moved in response to fluid introduced into and withdrawn from hydraulic cylinder 22 through lines 23 and 24. By this manner of operation, piston 18 on its compression stroke forces crystals directly into the end of column 10 while on its back stroke crystals are allowed to pass into feed section 14 from chiller 41. The repeated operation of piston 18 maintains and establishes a bed of crystals in the column which extends from about the filter section to the melting zone maintained in the end of the column by heat exchange means 29. On reaching the melting zone, at least a portion of the crystals are melted, and at least a part of the resulting melt is displaced upwardly as a reflux stream into the downwardly moving mass of crystals and in intimate contact therewith. As a result of the reflux stream contacting the crystals in the crystal bed, occluded impurities are displaced therefrom and are subsequently removed through filter section 16 by means of line 28. It is also within the scope of the invention to employ an additional wall-type filter section so as to provide separate means for removing displaced impurities and mother liquor from the column. A pure product in the form of melt or a mixture of melt and crystals is withdrawn from the purification column through line 31.

Referring to Figure 3 of the drawing, it is seen that de-icer ring 71 which has an upper edge in the form of a knife edge, is maintained in contact with the walls of the column piston. Accordingly, during the compression or downward stroke of the piston, any ice which may have formed on the piston is scraped therefrom by means of the knife edge of the de-icer ring. The ice so scraped from the piston falls into chamber 75 wherein it melts and is thereafter withdrawn from the column through holes 77 in flange member 52. If necessary, heat can be applied to chamber 75 by means of heating coil 78 in order to melt any ice accumulating in the chamber. Because of the removal of ice in this manner at a point above the location of the sealing means, the piston on passing the sealing means in its downward movement is free of any ice which might come into contact with the sealing means and thereby destroy its effectiveness. Because of the provision of means for preventing formation of ice on the piston, long periods of trouble-free operation are possible, and frequent replacement of the sealing means becomes unnecessary.

A more comprehensive understanding of the invention can be obtained by referring to the following illustrative example, which is not intended, however, to be unduly limitative of the invention.

*Example*

Crystal purification apparatus similar to that illustrated in the drawing is used in the purification of para-xylene. A feed material comprising, 60 weight percent para-xylene, the impurities being primary ortho- and meta-xylenes and ethyl benzene, is pumped into the chiller wherein it is cooled to a temperature of about 4° F. The resulting crystal slurry containing about 27.5 weight percent solids is passed from the chiller into the feed section of the crystal purification column during the upward stroke of the column piston.

On the downward stroke of the column piston, the crystal slurry in the feed section is contacted by the piston, thereby forcing mother liquor therefrom. This mother liquor passes through the piston and is subsequently removed from the column through the line attached to the piston. The continued downward movement of the column piston forces the crystals into the filter section of the column wherein additional mother liquor is separated from the crystals and then removed from the clumn. As a result of removal of mother liquor, a relatively dense bed of crystals is formed in the purification section below the filter section. This bed of crystals is moved through the purification section through the operation of the column piston and into the melting zone maintained in the end of the column. The melting zone is maintained at a temperature between 67 and 73° F. so that the crystals on entering the zone are melted. A portion of the melt is withdrawn through the product outlet line at the rate of about 15.0 g.p.h. as the product of the process, while the remainder of the melt is passed as reflux into the moving crystal bed. Filtrate is removed from the column at the rate of about 39.5 g.p.h. The filtrate contains about 45 weight percent para-xylene while the product contains about 98.8 weight percent para-xylene. During downward movement of the column piston, the de-icer ring scrapes the walls of the piston, thereby maintaining same free of ice. As a result, damage to the column seal is prevented and there is substantially no leakage of liquid from the column around the column piston.

Variations and modifications of the invention will become apparent to those skilled in the art upon consideration of the foregoing disclosure. Such variations and modifications are believed to come within the spirit and scope of the invention.

I claim:

1. Crystal purification apparatus comprising, in combination, an elongated purification column; means for melting crystals in one end portion of said column and conduit means for withdrawing product therefrom; means for introducing crystals into an intermediate portion of said column; an elongated, longitudinal slot in the wall of said column above said sealing means hereinafter recited; filtering means in said column between said crystal melting means and said crystal introduction means; a reciprocable piston in the opposite end portion of said column from said crystal melting means, said piston comprising an elongated, hollow cylindrical member with its end toward said melting means being open and its opposite end being closed, filter medium positioned in said open end of said cylindrical member, a plate member positioned in and attached to the walls of said cylindrical member above said filter medium, and a conduit attached to said plate member and in communication with the space formed between said plate member and said filter member, said conduit extending from said plate member through said closed end of said cylindrical member and exteriorly of said column through said longitudinal slot therein; sealing means in said column between the inner wall of said column and the outer wall of said piston; a ring member in contact with and encompassing the walls of said cylindrical member, the end of said ring member toward said closed end of said cylindrical member being in the form of a knife edge adapted to scrape the walls of said cylindrical member upon movement of said cylindrical member toward said filtering means, said ring member being positioned in an enlarged portion of said column between said sealing means and said opposite end of said column.

2. The crystal purification apparatus of claim 1 in which said ring member comprises a plurality of segments adapted to interlock to form an annulus, one end of said segments being in the form of a knife edge and the outer surface of said segments having a groove formed therein, and a circular resilient member is disposed in said groove of said segments so as to hold said segments against the walls of said cylindrical member.

3. The crystal purification apparatus of claim 1 in which a heating means is disposed adjacent said enlarged portion of said column and outlet means are positioned in the wall of said column in communication with said enlarged portion thereof.

4. The crystal purification apparatus of claim 1 in which said sealing means are positioned in a second enlarged portion of said column between said first-mentioned enlarged column portion and said crystal introduction means.

5. Crystal purification apparatus comprising, in combination, an elongated purification column, means for melting crystals in one end portion of said column and conduit means for withdrawing product therefrom; a reciprocable piston in the opposite end portion of said column; means for introducing crystals into an intermediate portion of said column; filtering means in said column between said crystal melting means and said crystal introduction means; a ring member in contact with and encompassing the walls of said piston, the end of said ring member away from said melting means being in the form of a knife edge adapted to scrape the walls of said piston upon movement thereof toward said filtering means, said ring member being positioned in an enlarged portion of said column between said crystal introduction means and said opposite end of said column; and sealing means positioned in said column between said ring member and said crystal introduction means.

6. The crystal purification apparatus of claim 5 in which a heating means is disposed adjacent said enlarged portion of said column and outlet means are positioned in the wall of said column in communication with said enlarged portion thereof.

7. Crystal purification apparatus comprising, in combination, an elongated purification column, means for melting crystals in one end portion of said column and conduit means for withdrawing product therefrom; a reciprocable piston in the opposite end portion of said column; means for introducing crystals into an intermediate portion of said column; filtering means in said column between said crystal melting means and said crystal introduction means; a ring member in contact with and encompassing the walls of said piston, the end of said ring member away from said melting means being in the form of a knife edge adapted to scrape the walls of said piston upon movement thereof toward said filtering means, said ring member being positioned between said crystal introduction means and said opposite end of said column; and sealing means positioned in said column between said ring member and said crystal introduction means.

References Cited in the file of this patent

UNITED STATES PATENTS

| | | |
|---|---|---|
| 2,650,479 | Kattis | Sept. 1, 1953 |
| 2,698,192 | Bily | Dec. 28, 1954 |
| 2,765,921 | Green | Oct. 9, 1956 |